(12) United States Patent
Pope et al.

(10) Patent No.: US 6,800,025 B2
(45) Date of Patent: Oct. 5, 2004

(54) COMBINE AIR SYSTEM FOR CLEANOUT

(75) Inventors: Glenn E. Pope, Viola, IL (US); John P. Vandevoorde, Lynn Center, IL (US)

(73) Assignee: Deere & Co., Moline, IL (US)

( * ) Notice: Subject to any disclaimer, the term of this patent is extended or adjusted under 35 U.S.C. 154(b) by 0 days.

(21) Appl. No.: 10/309,979

(22) Filed: Dec. 4, 2002

(65) Prior Publication Data

US 2004/0110548 A1 Jun. 10, 2004

(51) Int. Cl.$^7$ .............................................. A01F 12/60
(52) U.S. Cl. ....................... 460/103; 460/119; 460/150
(58) Field of Search .......................... 460/23, 103, 114, 460/119, 149, 150; 198/493, 494, 495

(56) References Cited

U.S. PATENT DOCUMENTS

| | | | | |
|---|---|---|---|---|
| 3,880,355 A | * | 4/1975 | Larson et al. ............ | 239/288.3 |
| 4,531,453 A | * | 7/1985 | Warman et al. ............ | 454/139 |
| 4,688,308 A | * | 8/1987 | Alvarez ................ | 29/33 R |
| 5,584,939 A | * | 12/1996 | Dahlin et al. ............ | 134/7 |

FOREIGN PATENT DOCUMENTS

| | | | | |
|---|---|---|---|---|
| JP | 11137064 A | * | 5/1999 | |
| JP | 2001028938 A | * | 2/2001 | |

OTHER PUBLICATIONS

9650STS and 9750 STS Combines manual, Deere & Co. 2002, 11 pages.*
Larry Reichenberger, "A shop to serve every need", Successful Farming, 1999, pp. 1–5.*

* cited by examiner

Primary Examiner—Robert E. Pezzuto
Assistant Examiner—Nathan Mammen
(74) Attorney, Agent, or Firm—The Law Office of Randall T. Erickson, P.C.

(57) ABSTRACT

A pressurized air cleaning system is provided for a harvesting apparatus having a grain tank for holding harvested crop. The cleaning system can include an air manifold and tubing network for receiving pressurized air and distributing the pressurized air to an outlet port near to the grain tank of the harvesting apparatus. The outlet port is located and configured for connecting a short portable air cleaning hose and wand to be wielded by an operator to clean the grain tank. The air manifold and tubing network can also include an outlet port near to the header, and/or next to the straw chopper, both accessible from grade level. The cleaning system can include air cleaning nozzles, fixed in position on the harvesting apparatus and connected to the network, the nozzles directing air streams onto hard-to-access areas of the harvesting apparatus. The nozzles can be located inside the grain compartment along the horizontal augers and in the unloader tube.

20 Claims, 6 Drawing Sheets

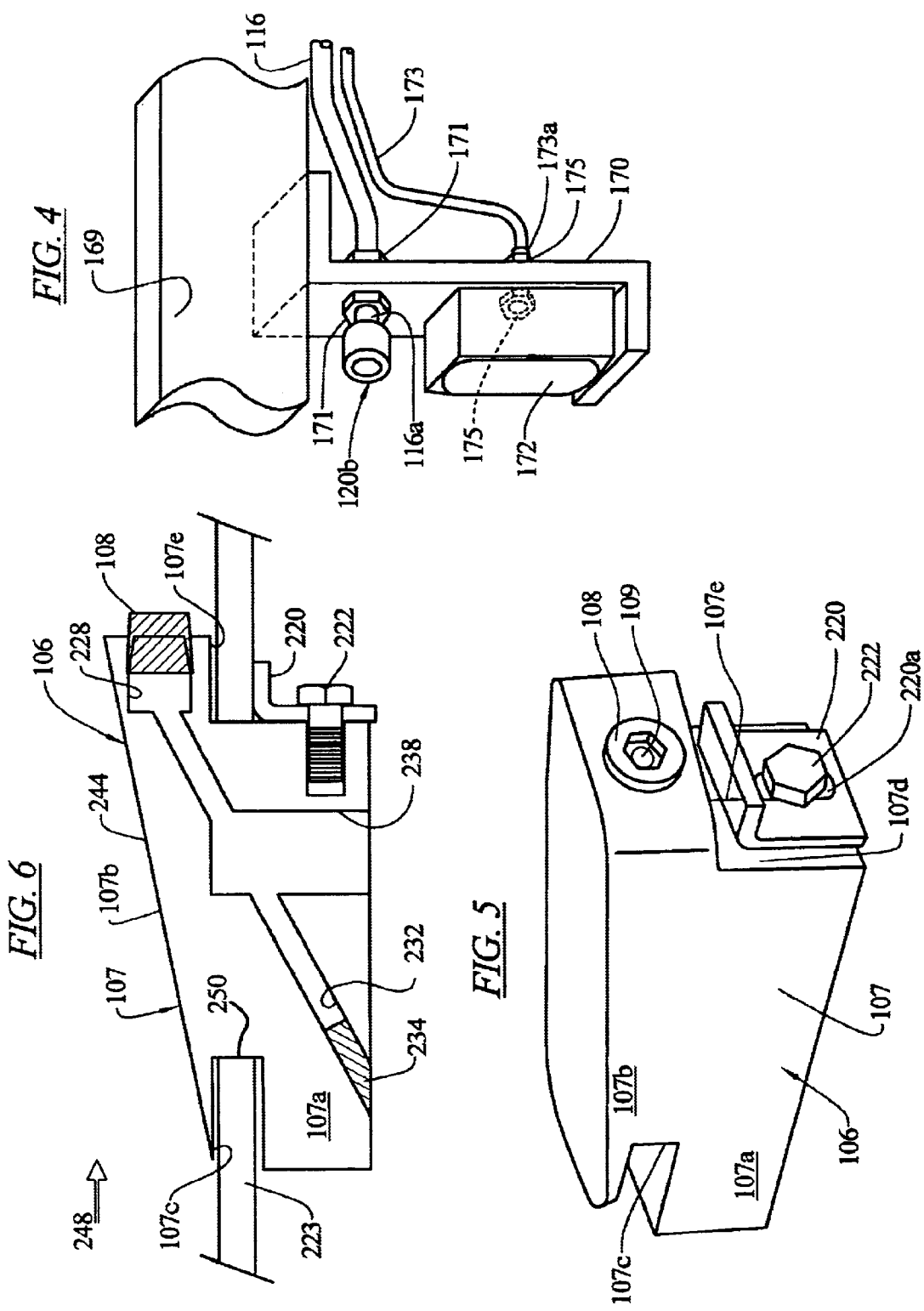

COMBINE AIR SYSTEM FOR CLEANOUT

TECHNICAL FIELD OF THE INVENTION

The invention relates to harvesting apparatus, such as combines. Particularly, the invention relates to a cleanout system for an unloader tube of a grain compartment of a harvesting apparatus.

BACKGROUND OF THE INVENTION

Horticultural crops may be classified as edible crops, inedible crops, genetically modified organisms (GMO's), non-GMO, organic, pesticide-free, or in accordance with other crop attributes. Inedible crops may include crops such as fiber, cotton or rubber, for example. Genetically modified crops may include vegetables that are genetically manipulated to hold their shelf life longer than traditionally cultivated vegetables. Organic crops are harvested from plants that are grown without exposure to certain pesticides, herbicides or other chemicals.

Crops may be grown to specific crop attributes or specifications. Crop attributes may be based on the genetic composition of a crop, the growing practices for a crop, or both. For example, a certain variety of corn may be grown that has greater oil content than other varieties because of genetic or environmental factors. Similarly, a certain variety of soybeans may be grown that has a different protein content or other crop attribute that is desirable. A processor, a pharmaceutical company, a manufacturer or another concern may desire to purchase agricultural products with specific crop attributes from a grower or another supplier. The grower or supplier may wish to charge a premium for crops with specific crop attributes compared to a commodity-type crop. The purchaser of the agricultural product may desire sufficient assurance that the agricultural product that is being purchased actually possesses the crop attributes that are sought.

Thus, a need exists to accurately identify crops with specific crop attributes throughout the growing and distribution of crops with specific crop attributes and any products derived therefrom. Further, a purchaser of an agricultural product or a crop may desire or demand the ability to trace the identity of the crop with specific crop attributes to verify the presence of the crop attributes, or the absence of undesired attributes, as a condition for a commercial transaction.

Therefore, there is a need to segregate crops during harvesting such that no mixing of crops or crop residue with different attributes occurs. It is desirable to thoroughly clean combines between harvesting crops of different attributes. However, after unloading a combine grain compartment, there may be crops, grain and residue left in portions of the combine that cannot be easily mechanically removed.

Presently, to thoroughly clean grain compartments, the operator must sometimes crawl into a very small space that is not accessible from the ground and vacuum out or sweep out the grain and residue. The typical time and effort to completely remove all the grain and residue from the combine, particularly from the grain tank and unloader tube, is very long and the task difficult due to access limitations in the unloader tube and other areas. During the cleanout of the grain tank, it is difficult to clean under the cross auger covers and in hidden areas of the tank as well. Another difficult problem in the combine cleanout procedure is getting the horizontal unloader tube clean. There is limited access and no effective method to inspect the tube for adequate cleaning.

Presently, one method of cleaning the combine is by the use of pressurized air to blow crops, grain and residue from confined areas of the combine. One of the more difficult problems in the cleanout procedure is handling a large and long air hose and a long wand around and over the combine to reach different areas. Areas such as in the grain tank and in the engine compartment are especially difficult to access and clean without causing damage to expensive parts such as trim panels which are easily scratched by the air hose draped over, and sliding over, trim panels.

The present inventors have recognized that it would be desirable if harvesting apparatus, such as combines, were more easily and quickly thoroughly cleaned between harvesting of crops of different attributes.

The present inventors have recognized that it would be desirable to use an air stream method of cleaning a combine which was less strenuous on the cleaning person and which was less prone to damage or scratching of trim panels or other combine components.

SUMMARY OF THE INVENTION

A cleaning system is provided for a farming apparatus having a grain compartment for holding grain or other crop material. Particularly, the cleaning system is provided for a harvesting apparatus having a grain tank for holding harvested crop.

The cleaning system can include an air manifold and tubing network for receiving pressurized air and distributing the pressurized air to an outlet port near to the grain tank of the harvesting apparatus. The outlet port is located and configured for connecting a short portable air cleaning hose and wand to be wielded by an operator to clean the grain tank. The air manifold and tubing network can also include an outlet port near to the header, and/or next to the straw chopper, both accessible from grade level. Outlet ports can be located at each of four corners of the harvesting apparatus.

The cleaning system can include air cleaning nozzles, fixed in position on the harvesting apparatus and connected to the network, the nozzle directing an air stream onto an area of the harvesting apparatus, and the network comprises a shutoff valve located between the nozzle and the manifold.

The air manifold can be located on the harvesting apparatus where an external source of pressurized air can be easily connected. Outlet ports can be located around the harvesting apparatus where a short air hose could be easily connected and used at the basic four corners of the harvesting apparatus as well as in the grain tank area.

According to the invention, an effective air hose can be made short, light, and easy to handle. The remote outlet ports are at locations where grain or debris accumulates. Additionally, supplying the system with strategically placed nozzles and associated shutoff valves is effective to clean areas without manual cleaning and noticeably reduces cleaning time for a harvesting apparatus.

Numerous other advantages and features of the present invention will be become readily apparent from the following detailed description of the invention and the embodiments thereof, from the claims and from the accompanying drawings.

BRIEF DESCRIPTION OF THE DRAWINGS

FIG. 1A is an enlarged side view of a grain compartment area of the apparatus of FIG. 1;

FIG. 4 is a perspective view of a light bracket carrying an air outlet port;

FIG. 5 is a perspective view of an air nozzle; and

FIG. 6 is a sectional view taken generally along line 6—6 in FIG. 1;

DETAILED DESCRIPTION OF THE PREFERRED EMBODIMENTS

Figure 1:
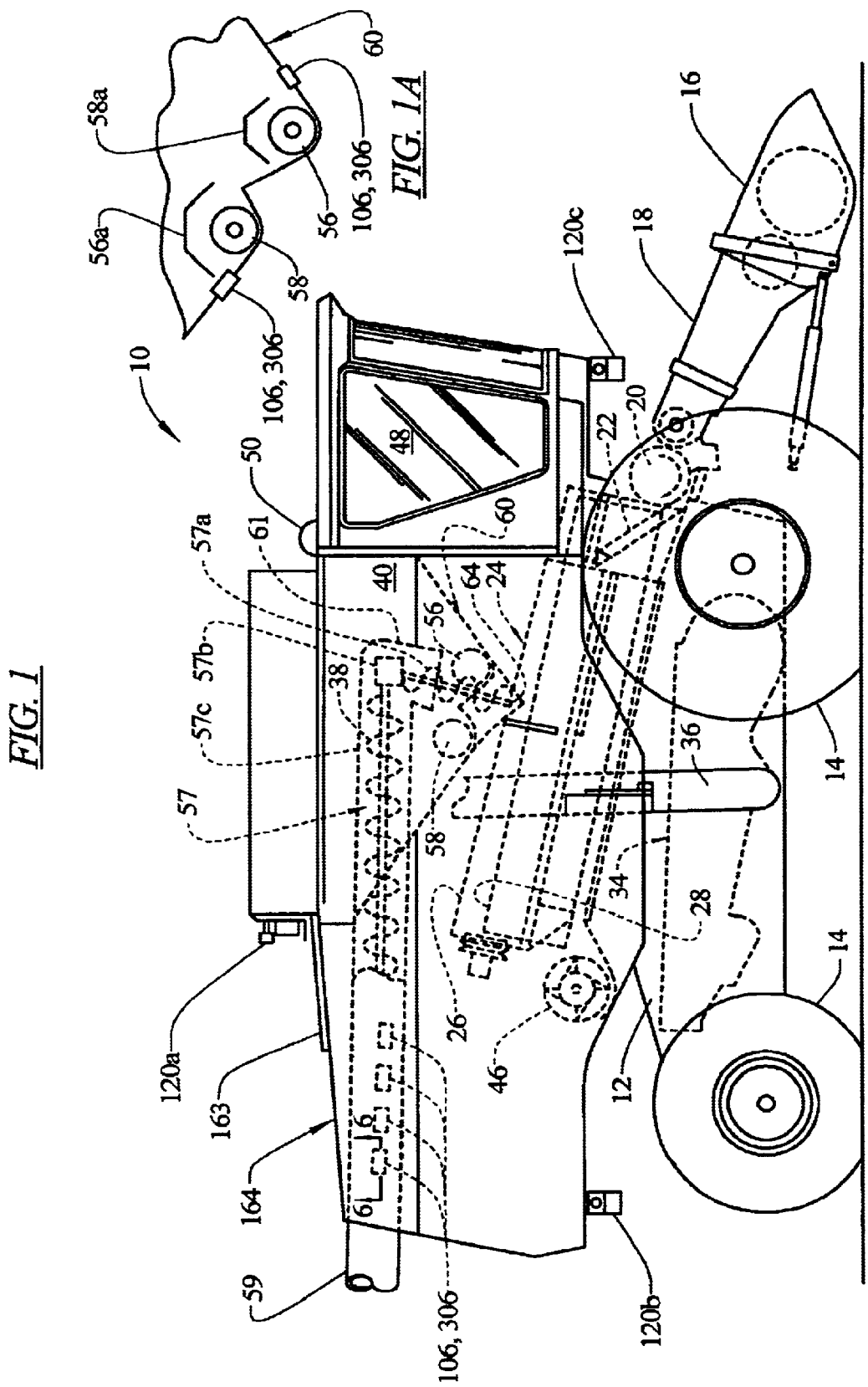
FIG. 1 is a schematic side view of a harvesting apparatus that incorporates the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 2:
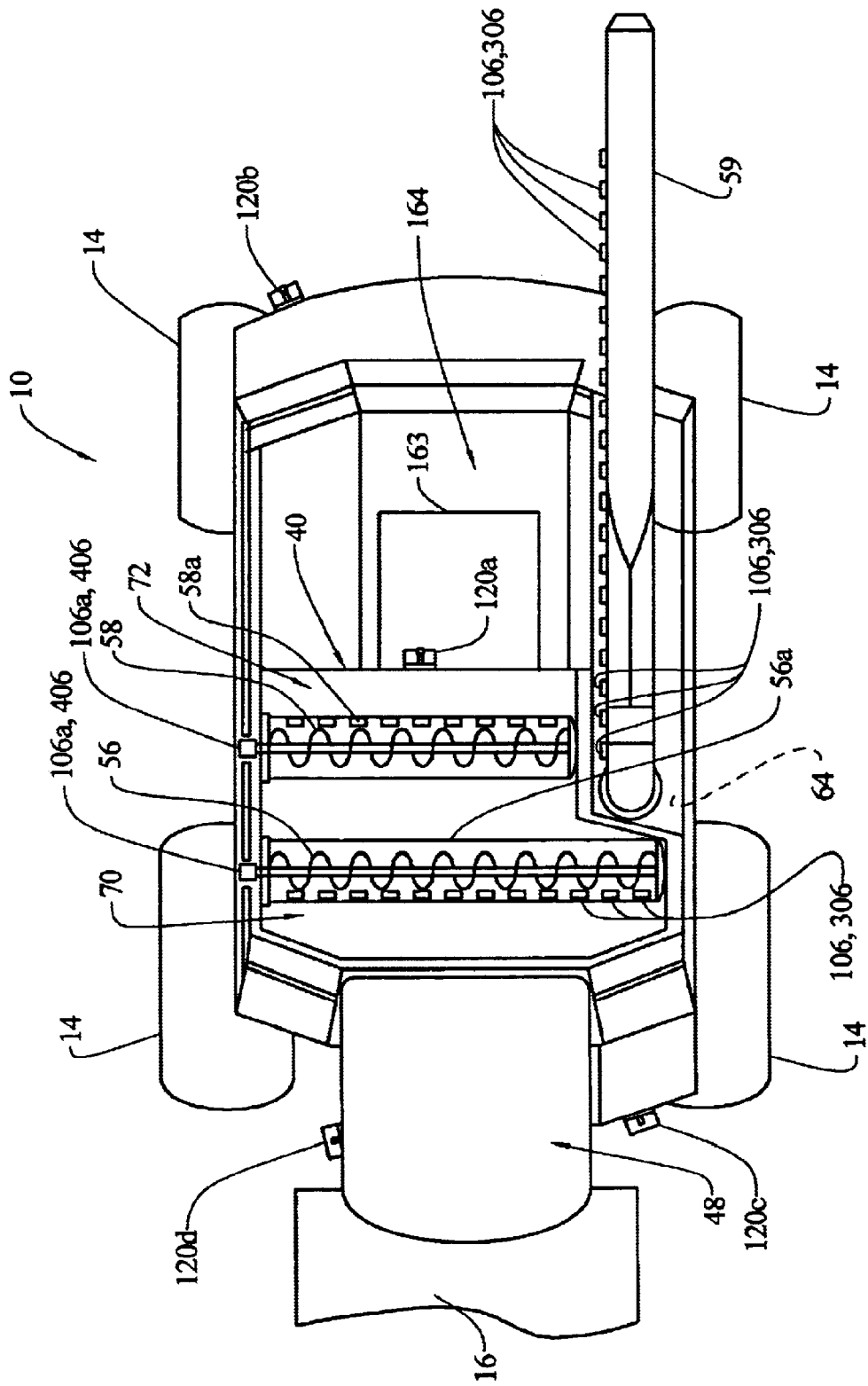
FIG. 2 is a schematic plan view of the harvesting apparatus of FIG. 1.

FIGS. 1 and 2 illustrate a harvesting apparatus, such as an agricultural combine 10. Such combines are of a type described for example in U.S. Pat. No. 6,285,198, herein incorporated by reference, and are also of the type commercially available as a JOHN DEERE 9650 STS or 9750 STS combine. Although the invention is being described as being incorporated into a rotary combine, it may also be used on other combines, such as conventional straw walker machines.

FIG. 1 shows an agricultural combine 10, also known as a combine thresher. The combine 10 comprises a supporting structure 12 having ground engaging means 14 extending from the supporting structure. A harvesting platform 16 is used for harvesting a crop and directing it to a feederhouse 18. The harvested crop is directed by the feederhouse 18 to a beater 20. The beater directs the crop upwardly through an inlet transition section 22 to the axial crop processing unit 24. The axial crop processing unit is located between, and supported by the sidesheets of the combine.

The axial crop processing unit 24 comprises an axial rotor housing 26 and an axial rotor 28 located in the housing. The harvested crop enters the housing through the inlet transition section 22. The rotor is provided with an infeed portion, a threshing portion and a separating portion. The rotor housing has a corresponding infeed section, a threshing section and a separating section.

Both crop processing portions, the threshing portion and the separating portion, are provided with crop engaging assemblies. The threshing section of the rotor housing is provided with a concave and the separating section is provided with a grate. Grain and chaff released from the crop mat falls through the concave and the grate. The concave and grate prevent the passage of crop material larger than grain or chaff from entering the cleaning system 34.

As illustrated in FIG. 1, grain and chaff falling through the concave and grate is directed to cleaning system 34 which removes the chaff from the grain. The clean grain is then directed by a clean grain elevator 36 to a fountain auger (not shown). The fountain auger directs the grain into a grain tank or grain compartment 40. The clean grain elevator 36 and the fountain auger comprise a means for moving the clean grain from the grain floor of the combine to a storage bin formed by the grain tank 40. The grain is removed from the grain tank 40 by an unloading auger 57. As the straw reaches the end of the crop processing unit it is expelled through an outlet to a beater 46. The beater 46 propels the straw out the rear of the combine. The operation of the combine is controlled from the operator's cab 48.

When the clean grain compartment is to be unloaded, transverse unloading augers 56 and 58 direct the grain to the side of the compartment where it comes into contact with an unloading auger 57 which directs the clean grain through a vertical unloading tube 61 and a horizontal unloading tube 59. The auger 57 includes a vertical section 57a, at least partially within the tube 61, a right angle gear 57b, and a horizontal section 57c within the tube 59. During an unloading operation, tube 59 would normally be extended outwardly from the side of the combine so that clean grain can be more readily directed into a wagon or truck.

The grain compartment 40 includes a trough 60, which includes a major trough region 70 and a minor trough region 72 that house the horizontal augers 56, 58, respectively. The trough 60 is open to a charge housing or sump 64. The vertical auger section 57a extends through the vertical tube 61 and into the sump 64. The grain which is fed through the trough horizontally by the horizontal augers 56, 58 is delivered into the sump 64 and is removed by the vertical auger section 57a through the tube 61, and by the horizontal auger section 57c through the tube 59.

Figure 3:
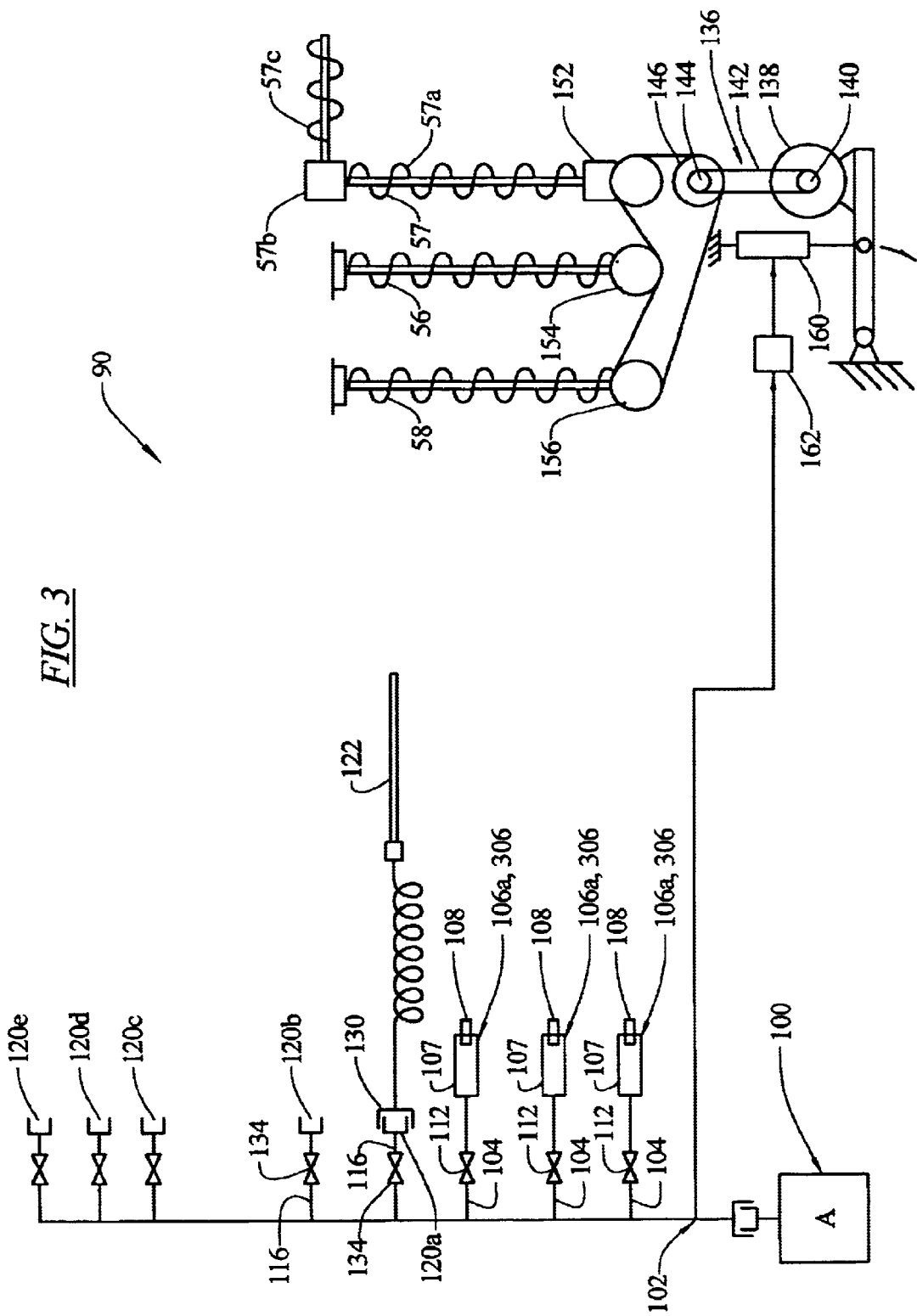
FIG. 3 is a schematic diagram of a pressurized air cleaning system of the invention.

FIG. 3 illustrates in schematic fashion an air system 90 of the invention. An air supply 100 delivers pressurized air into a tubing system 102 that extends throughout the harvesting apparatus 10. The air supply 100 can be external to the combine 10. The tubing system 102 includes branch lines 104 that deliver air to stationary nozzles 106, 106a or alternate nozzles 306, 406 (described in FIGS. 7 and 8) that each includes a nozzle body 107, or alternately 307, 407 that delivers air to the nozzle element 108, or alternately 314, 414. Air passes at high velocity through an orifice 109 (FIG. 5) or alternately 316, 416 (FIGS. 7 and 8), of the element 108 or alternately 314, 414. Although, for simplicity, only two nozzles 106, 306 and one nozzle 106a, 406 are shown, it is to be understood that many nozzles could be deployed throughout the harvesting apparatus 10 and located at hard-to-access or confined locations such as within the unloader tube 59, around the augers 56, 57, 58, or under the horizontal auger covers 56a, 58a (FIG. 1A, and shown in phantom in FIG. 2). Each branch lines 104 can include a shutoff valve 112.

The tubing system 102 further includes branch lines 116 that each terminate in a quick connect fitting 120a, 120b, 120c, 120d. A portable air wand 122 can be connected to the fittings 120a–120e via a coiled air hose 126 and a compatible quick connect fitting 130. The fittings 120a–120e, 130 can alternately be threaded fittings or any other known fluid-containing connector for pressurized air.

Although a few branch lines 116 and fittings 120a–120e are shown, many branch lines 116 and fittings can be provided throughout the harvesting apparatus 10. The branch lines 116 can also be provided with shutoff valves 134.

To enhance the cleaning operation, the augers 56, 57, 58 are slowly turned by an auxiliary rotary power system 136. The auxiliary rotary power system 136 for slowly turning the augers 56, 57, 58 during cleanout is described in detail in U.S. application Ser. No. 10/309,977, filed on the same day as the present application, herein incorporated by reference.

As a brief description, the auxiliary rotary power system 136 includes a 12 volt DC motor 138 that, when activated during cleanout operation, drives a pulley 140 that drives a belt 142. The belt 142 drives a pulley 144 that drives a sprocket 146 that is driven at high speed in normal unloading operation by the combine drivetrain. The sprocket 146 drives a chain 148 that drives a sprocket 150 that drives a right angle gear 152 that turns the auger 57. The chain also drives sprockets 154, 156 that rotate the augers 56, 58. The relatively small motor 138 drives the augers 56, 57, 58 at slow speeds during cleanout operation. A pneumatic cylinder 160 is controlled by a pneumatic control 162 to rotate the motor 138 to tighten the belt 142 to drive the pulley 144. The pneumatic control 162 is supplied with pressurized air from the air source 100.

Returning to FIGS. 1 and 2, the fittings 120a–120e are preferably arranged as follows. A grain tank fitting 120a is located at an elevated position on a rear side of the grain tank 40. This allows an operator standing on an access platform 163 to connect the fitting 130 to the fitting 120a, and using the wand 122 blow clean the grain tank area 40 and the engine area 164.

A rear fitting 120b is arranged at an elevation accessible from grade level adjacent to the straw chopper 44. This position allows the fitting 130 of the wand 122 to be connected to the fitting 120b and the wand used by the operator to blow clean the straw chopper 44 and other rear areas of the harvesting apparatus 10.

A front left connector 120c is also mounted to be accessed from grade. When the wand connector 130 is connected to the left connector 120c the wand 122 can be used to blow clean a left side portion of the harvesting platform 22. A front right connector 120d is mounted at about the same elevation as the connector 120c, on an opposite side of the operator cab, and can be used to connect the wand 122 for cleaning the right side of the harvesting platform 22.

FIG. 4 illustrates an exemplary mounting system for each of the fittings 120b, 120c, 120d and 120e, with the fitting 120b being an example. According to the embodiment, the tubing branch 116 and the fitting 120b are fixed to a bracket 170 that is fixed to chassis structure 169 by welding or fasteners. The fitting 120b can be secured by threaded nuts 171 located on opposite sides of the bracket 170, and threaded on a threaded portion 116a of the tubing 116, to clamp the bracket 170 between the nuts 171. The bracket 170 also serves to mount a driving light 172 that is electrically connected to vehicle electric power by a cable 173. The light 172 and cable 173 can be secured by threaded nuts 175 located on opposite sides of the bracket 170, and threaded on a threaded portion 173a of the cable 173, to clamp the bracket 170 between the nuts 175. By mounting these two elements 120b, 172 on a single bracket 170, the number of separate parts for the harvesting apparatus is minimized. Assembly time is correspondingly reduced. The tubing 116 and cable 173 can be routed together on the chassis, further reducing assembly time. A similar bracket and light arrangement can be used at the elevated fitting 120a.

Returning to FIGS. 1, 1A and 2, it is shown that plural fixed nozzles 106, 106a or alternately 306, 406 are provided within the grain compartment 40 adjacent to and along each auger 56, 58. The nozzles can be spaced apart by a foot or so along the length of the augers 56, 58 and can have their orifices arranged so that air flow is directed axially and/or down the sloping wall of the grain compartment. Nozzles 106a or 406 are provided through the sidewall of the compartment 40 that is farthest from the sump 64 directing air axially down the augers 56, 58. Plural nozzles 106 or 406 are also provided within the horizontal unloader tube 59.

The nozzles 106, 306 can be configured, located and spaced as shown and described in U.S. application Ser. No. 10/309,978, filed on the same day as the present application, herein incorporated by reference.

One nozzle 106 is illustrated in FIG. 5. The nozzles 106a would be similarly configure but with the orifice turned 90 degrees. The nozzle body 107 includes a base block portion 107a and an inside block portion 107b. A slot 107c is formed in the base block portion 107a adjacent to the inside block portion 107b at an upstream end of the nozzle body 107. At a downstream end of the base block portion 107a the inside block portion 107b overhangs the base block portion 107a. A clamp bracket 220 is fastened with a bolt 222 to a downstream face 107d of the base block portion 107a. A gap 107e is formed between a bottom surface of the inside block portion 107b and a top surface of the bracket 220. The bracket includes a slot 220a for sliding the bracket 220 tight against a combine wall 223, such as the wall of the unloader tube 59 or of the grain compartment trough 60, before the bolt 222 is tightened.

As shown in FIG. 6, the nozzle 106 includes the nozzle element 108 which is threaded into an opening 228 in the inside block portion 107b. A through bore 232 is plugged with a weld plug 234 after its formation through the base block portion 107a and the inside block portion 107b. The through bore 232 connects to the opening 228. The nozzle element 108 can be installed using an Allen wrench. An inlet bore 238 extends substantially perpendicular to a bottom face of the base block portion 107a and intersects the through bore 232. The inlet bore 238 is threaded to accept an air supply fitting.

The inside block portion 107b is tapered to form an inclined top surface 244 that increases in distance from the inside surface of the tube 59 or sump in the direction of grain flow 248. Because of this taper, the nozzle body 107 is protected from undue wear from impingement by grain. Plugging of the unloader auger or sump with grain due to grain flow drag or interference is also prevented.

The nozzle 106 is installed onto, and into, a rectangular opening 250 in the wall 223. The slot 107c receives a portion of the wall 223 and the bracket 220 is slid against the wall 223 and the bolt 222 is tightened to capture the wall 223. The inside block portion of 107b is effectively inside the wall 223 and the base block portion 107a is effectively outside the wall 223.

Figure 7:
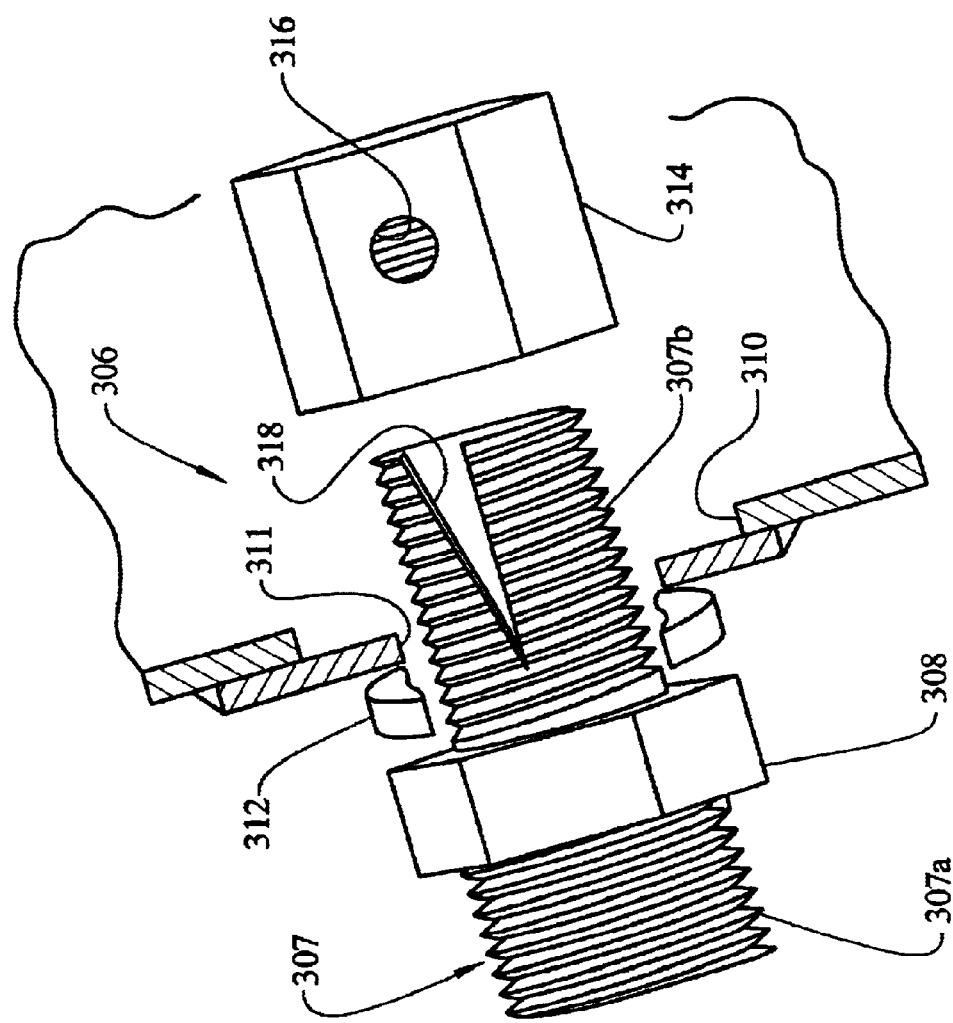
FIG. 7 is an enlarged, exploded perspective view, shown partly in section, all of an alternate embodiment nozzle mounted to the grain tank.

FIG. 7 illustrates an alternate nozzle 306. The nozzle 306 includes a nozzle body 307 having a threaded, tubular base portion 307a and a threaded tubular inside portion 307b, separated by a wrench-engageable block 308. The base portion 307a receives a threaded, pressurized air connection (not shown). The inside portion 307b is inserted through a hole 310 in the wall 223. The inside portion 307b also passes through a hole 311 formed through a mounting plate 223a that is welded to the wall. A lock nut 312 and a hex cap 314 are threaded onto the inside portion 307b to clamp the nozzle 306 to the plate 223a. The hex cap 314 includes an orifice 316, and the inside portion 307b includes a triangular slot 318. By selecting the position of the hex cap 314 along the length of the inside portion 307b, the effective size of the air opening through the orifice 316 from inside the inside portion 307b can be adjusted. The lock nut 312 is then positioned along the inside portion 307b to clamp the plate 223a against the hex cap 314.

By use of this nozzle 306, the orientation of the orifice 316 inside the tube 59, or sump 60 can be easily changed by loosening the lock nut 312 and reorienting the body 307. Preferably, the orifice is positioned at about 1–2 mm above the inside surface of the wall 223.

Figure 8:
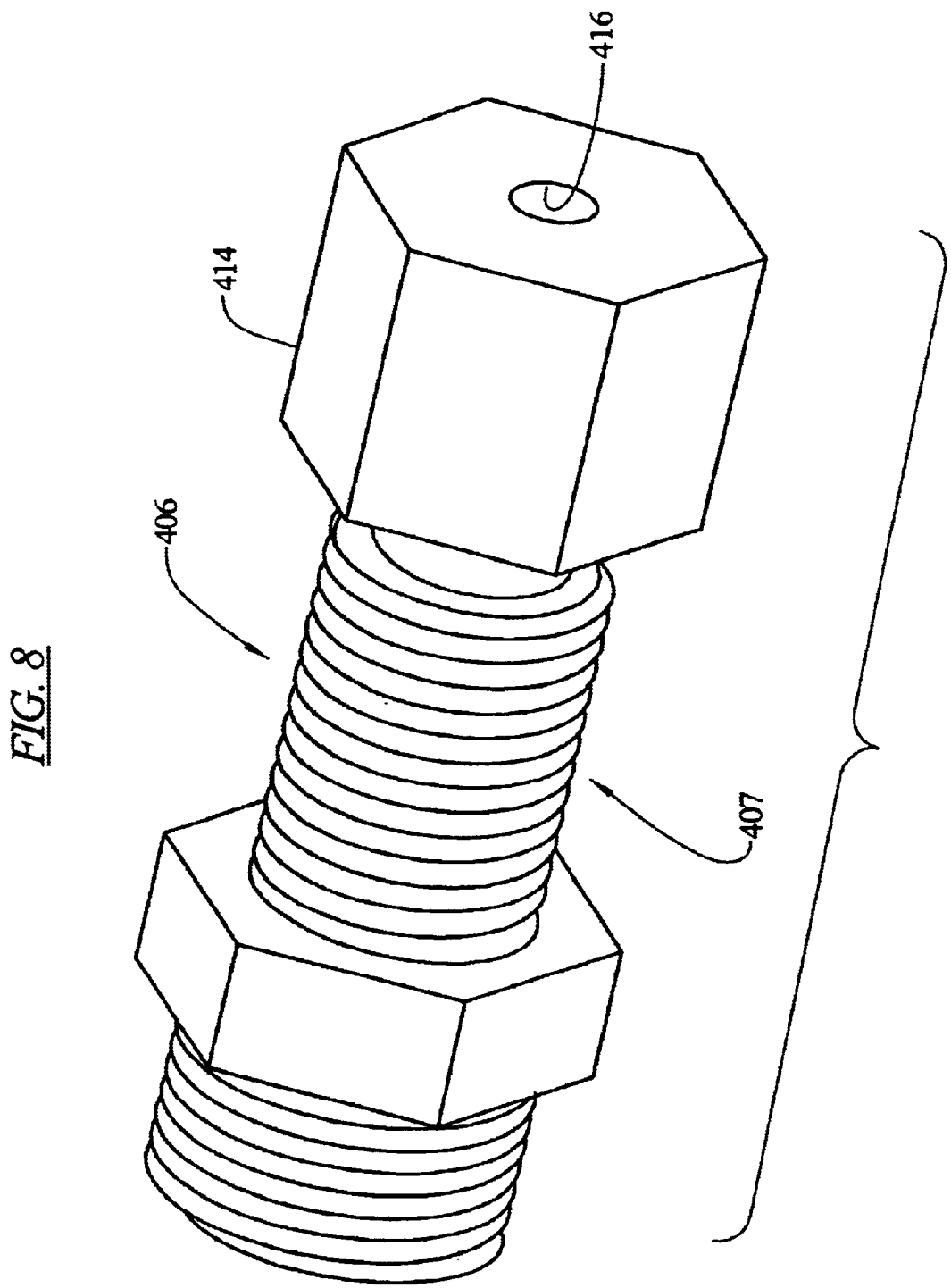
FIG. 8 is an enlarged, exploded perspective view, shown partly in section, all of a further alternate embodiment nozzle.

FIG. 8 illustrates an alternate nozzle 406. This nozzle 406 can be used in the positions shown in FIG. 2. The nozzle 406 includes an alternate nozzle body 407 identical to the nozzle body 307 of FIG. 7, except having no slot 318. An alternate hex cap 414 includes an axially arranged orifice 416. The installation of the nozzle 406 onto the wall 223, such as the end wall of the trough 60, is the same as the installation of the nozzle 306 shown in FIG. 7. The lock nut 312 (not shown) is positioned along an inside portion of the nozzle body 407 to clamp the plate 223a (not shown) against the hex cap 414.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. In a harvesting apparatus having a structure including a grain compartment that is movable through a field during operation, a cleaning system comprising:
   a tubing system attached to said structure of the harvesting apparatus to move with said structure during operation, said tubing system connectable to pressurized air at one location and having an outlet port near to a top of said grain compartment, said outlet port located and configured for connecting a pressurized air cleaning hose.

2. The cleaning system according to claim 1, comprising plural outlet ports located adjacent to at least three of four corner areas of the harvesting apparatus.

3. The cleaning system according to claim 1, wherein said harvesting apparatus further comprises at least one air cleaning nozzle fixed in position on the harvesting apparatus and flow connected to said tubing system, said nozzle having an air outlet directed onto an area of said harvesting apparatus.

4. The cleaning system according to claim 1, comprising plural outlet ports located adjacent to at least two of four corner areas of the harvesting apparatus, wherein said outlet ports are configured for connecting a hand-held pressurized air cleaning hose.

5. The cleaning system according to claim 1, wherein said harvesting apparatus further comprises a plurality of air cleaning nozzles fixed in position within said grain compartment and flow connected to said tubing system, said nozzles having nozzle outlets directed along a bottom surface of said grain compartment to assist cleanout of grain from said grain compartment.

6. The cleaning system according to claim 5, wherein said harvesting apparatus comprises a horizontal auger within said grain compartment, and said plurality of nozzles are arranged spaced apart along said horizontal auger, said nozzles having nozzle outlets directed in directions having common directional components substantially along an axis of said horizontal auger.

7. The cleaning system according to claim 1, wherein said tubing system includes fixed nozzles located within said grain compartment and configured to dispense pressurized air to clean confined areas of said grain compartment.

8. In a harvesting apparatus having a grain compartment, a cleaning system comprising:
   a tubing system carried on the harvesting apparatus and connectable to pressurized air at one location and having an outlet port near to a top of said grain compartment, said outlet port located and configured for connecting a pressurized air cleaning hose;
   wherein said harvesting apparatus further comprises at least one air cleaning nozzle fixed in position on the harvesting apparatus and flow connected to said tubing system, said nozzle having an air outlet directed onto an area of said harvesting apparatus;
   wherein said harvesting apparatus comprises a horizontal auger and said cleaning system comprises a plurality of nozzles arranged spaced apart along said horizontal auger, said nozzles flow connected to said tubing system and having air outlets directed in directions having common directional components substantially along an axis of said horizontal auger.

9. In a harvesting apparatus having a structure that is movable through a field during operation, a cleaning system comprising:
   a tubing system attached to said structure of the harvesting apparatus to move with said structure during operation, said tubing system connectable to pressurized air at one location and having plural outlets, said outlets spaced apart around the harvesting apparatus, said outlets configured for dispensing pressurized air, including at least one outlet accessible by an operator from grade and at least one outlet accessible by an operator from said structure above grade.

10. The cleaning system according to claim 9, wherein said outlets include outlet ports for connecting a hand-held pressurized air cleaning hose.

11. The cleaning system according to claim 10, wherein said outlets include fixed nozzles located and configured to dispense pressurized air to clean confined areas of said harvesting apparatus.

12. The cleaning system according to claim 9, wherein said outlets include fixed nozzles located and configured to dispense pressurized air to clean confined areas of said harvesting apparatus.

13. The cleaning system according to claim 9, wherein said outlets comprise plural outlet ports located adjacent to at least two of four corner areas of the harvesting apparatus, wherein said outlet ports are configured for connecting a hand-held pressurized air cleaning hose.

14. The cleaning system according to claim 9, wherein said harvesting apparatus comprises a grain compartment, and said outlets comprise a plurality of air cleaning nozzles fixed in position within said grain compartment and flow connected to said tubing system, said nozzles having nozzle outlets directed along a bottom surface of said grain compartment to assist cleanout of grain from said grain compartment.

15. The cleaning system according to claim 14, wherein said harvesting apparatus comprises a horizontal auger within said grain compartment, and said plurality of nozzles are arranged spaced apart along said horizontal auger, said nozzles having air outlets directed in directions having common directional components substantially along an axis of said horizontal auger.

16. The cleaning system according to claim 9, wherein said harvesting apparatus comprises a grain compartment, and said outlets include fixed nozzles located within said grain compartment and configured to dispense pressurized air to clean confined areas of said grain compartment.

17. The cleaning system according to claim 9, wherein said harvesting apparatus comprises a grain compartment, and a horizontal auger within said grain compartment, and said outlets comprise a plurality of nozzles within said grain compartment arranged spaced apart along said horizontal auger, said nozzles flow connected to said tubing system and having nozzle outlets directed in directions having common directional components substantially along an axis of said horizontal auger.

18. In a harvesting apparatus, a cleaning system comprising:
- a tubing system carried on the harvesting apparatus and connectable to pressurized air at one location and having plural outlets, said outlets spaced apart around the harvesting apparatus, said outlets configured for dispensing pressurized air;
- wherein said harvesting apparatus comprises a horizontal auger and said cleaning system comprises a plurality of nozzles arranged spaced apart along said horizontal auger, said nozzles flow connected to said tubing system and having nozzle outlets directed in directions having common directional components substantially along an axis of said horizontal auger.

19. In a harvesting apparatus having a structure that is movable through a field during operation, a cleaning system comprising:
- a tubing system attached to said structure of the harvesting apparatus to move with said structure during operation, said tubing system connectable to pressurized air at one location and having plural outlets, said outlets spaced apart around the harvesting apparatus, said outlets configured for dispensing pressurized air, including at least one outlet accessible by an operator on one side of the apparatus and at least one outlet accessible by an operator on another side of the apparatus.

20. The cleaning system according to claim 19, wherein said outlets are configured for connecting a hand-held pressurized air cleaning hose.

* * * * *